United States Patent
Leeds et al.

(10) Patent No.: US 8,739,242 B2
(45) Date of Patent: May 27, 2014

(54) DIGITAL RIGHTS MANAGEMENT IN A COLLABORATIVE ENVIRONMENT

(75) Inventors: Bennett Leeds, Los Gatos, CA (US); Donald R. Walling, Campbell, CA (US); Arun Anantharaman, Los Altos Hills, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1662 days.

(21) Appl. No.: 12/168,377

(22) Filed: Jul. 7, 2008

(65) Prior Publication Data

US 2014/0033265 A1 Jan. 30, 2014

(51) Int. Cl.
G06F 21/00 (2013.01)

(52) U.S. Cl.
USPC .................. 726/1; 726/4; 709/205; 709/229; 705/51

(58) Field of Classification Search
USPC ........ 726/1–4, 26–30, 21; 709/226, 229, 225, 709/203–205; 713/165; 705/51, 901; 707/608
See application file for complete search history.

(56) References Cited

U.S. PATENT DOCUMENTS

| | | | | |
|---|---|---|---|---|
| 6,070,185 | A * | 5/2000 | Anupam et al. | 709/204 |
| 7,434,048 | B1 * | 10/2008 | Shapiro et al. | 713/165 |
| 7,624,188 | B2 * | 11/2009 | Koskelainen | 709/229 |
| 8,150,820 | B1 * | 4/2012 | Herbach et al. | 707/705 |
| 2002/0077984 | A1 * | 6/2002 | Ireton | 705/51 |
| 2003/0078891 | A1 * | 4/2003 | Capitant | 705/57 |
| 2003/0105734 | A1 * | 6/2003 | Hitchen et al. | 707/1 |
| 2005/0210102 | A1 * | 9/2005 | Johnson et al. | 709/204 |
| 2005/0262249 | A1 * | 11/2005 | Koskelainen | 709/229 |
| 2007/0083592 | A1 * | 4/2007 | Bartram et al. | 709/204 |
| 2007/0143855 | A1 * | 6/2007 | Gilchrist et al. | 726/26 |
| 2007/0250506 | A1 * | 10/2007 | Stevens et al. | 707/8 |
| 2007/0255788 | A1 * | 11/2007 | Troung | 709/205 |
| 2008/0066185 | A1 * | 3/2008 | Lester et al. | 726/27 |
| 2008/0109886 | A1 * | 5/2008 | Matsumoto et al. | 726/5 |
| 2008/0320000 | A1 * | 12/2008 | Gaddam | 707/9 |
| 2009/0089379 | A1 * | 4/2009 | Pegg | 709/206 |
| 2009/0132520 | A1 * | 5/2009 | Nemeth et al. | 707/5 |
| 2009/0193096 | A1 * | 7/2009 | Boyer et al. | 709/217 |

OTHER PUBLICATIONS

Design and Implementation of Digital Right Management in a Collaborative Peer-To-Peer Network, Hao Shi et al, pp. 198-203, IEEE, 2007.*

Christopher D. Cera et al, Role-based viewing envelopes for information protection in collaborative modeling, Computer- Aided Design 36, pp. 873-886, ELSEVIER, 2004.*

* cited by examiner

Primary Examiner — David García Cervetti
Assistant Examiner — Shanto M Abedin
(74) Attorney, Agent, or Firm — Schwegman Lundberg & Woessner, P.A.

(57) ABSTRACT

A system for enforcing rights management policies in a collaborative environment is provided. The system may reside at a collaboration host and may include a session manager to manage a collaborative session associated with a plurality of participants, a shared view detector to detect a request to distribute shared content to participants of the collaborative session, a policy module to obtain a rights management policy associated with at least a portion of the shared content, a filter generator to generate a filter based on the obtained rights management policy, and a shared view distributor to distribute the shared content to the participants of the collaborative session together with the filter.

19 Claims, 8 Drawing Sheets

US 8,739,242 B2

DIGITAL RIGHTS MANAGEMENT IN A COLLABORATIVE ENVIRONMENT

TECHNICAL FIELD

This disclosure relates generally to the technical fields of software and/or hardware technology and, in one example embodiment, to system and method for responding to security vulnerability.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Digital rights management (DRM) and enforcement is desirable in connection with digital content such as, for example, digital audio, digital video, digital text, digital data, digital multimedia, where such digital content is to be distributed to users. DRM is access and rights control technology that limits usage of digital content. DRM may be applied to files opened within a single-user application (e.g., ADOBE® READER®, ADOBE® ACROBAT®, MICROSOFT® WORD®, etc.). A DRM policy specifies permissions for users and groups as well as conditions under which policy-governed files can be used. For ease of administration, policies may be grouped into policy sets. Grouping several policies into a set may be useful when document-specific policies share similar attributes.

Collaborative applications permit multiple users to share interactive views of applications and data. A collaborative session is a virtual entity in which a screen or an application running on a computer system of one user (referred to as a presenter in a collaborative session) may be shared with one ore more other participants. Such shared content may be viewed and/or manipulated by other participants.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
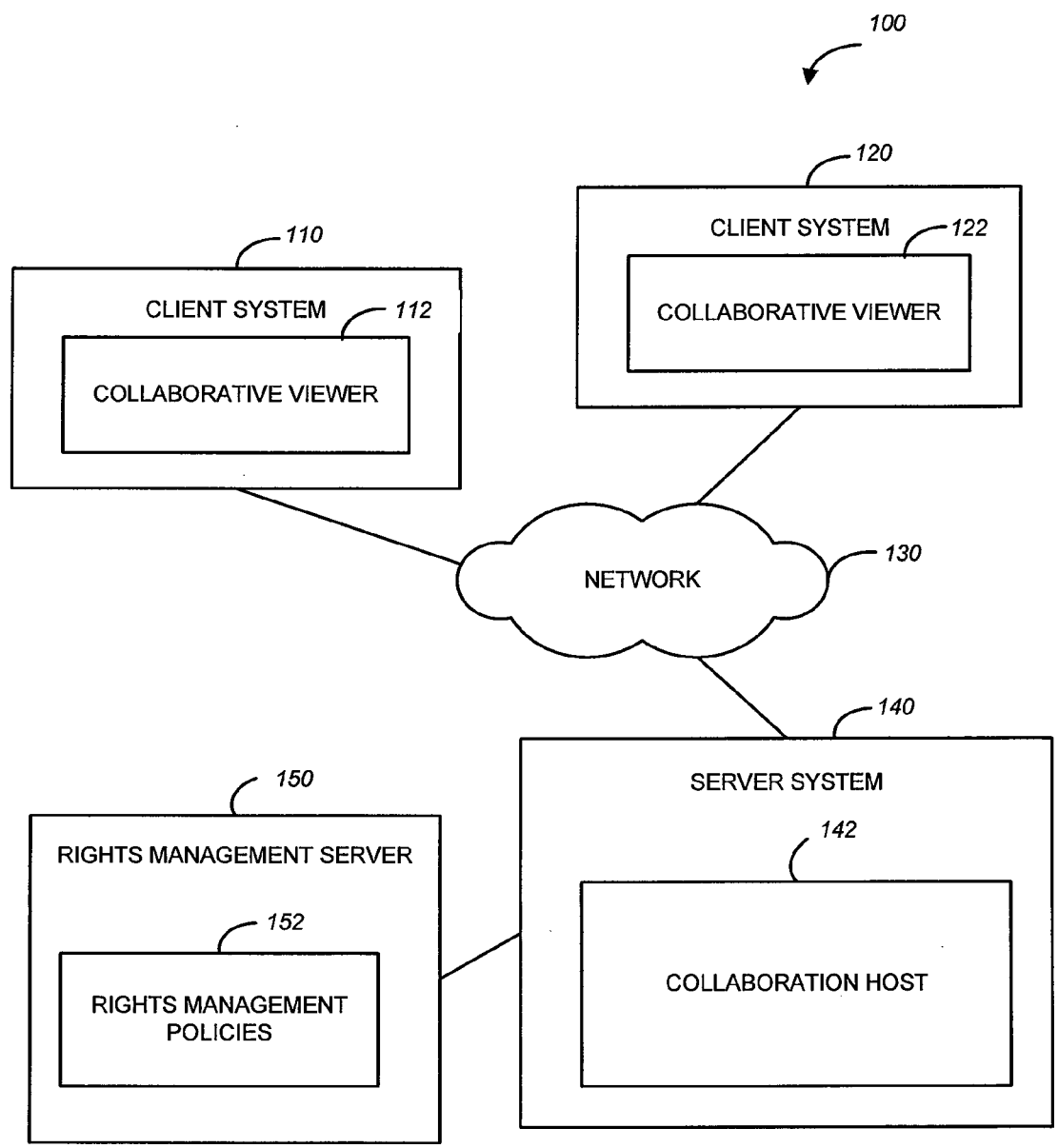
FIG. 1 is a block diagram showing a network environment within which a method and system for managing digital rights in a collaborative environment may be implemented, in accordance with an example embodiment.

Utilizing digital rights management in a single user environment typically includes creating a protected document by encrypting data in the document and also including metadata about the file and its protection. Metadata may include a unique ID associated with the protected document and the Uniform Resource Locator (URL) of the rights management server where permission to open the document are stored. When a user attempts to open a protected document, the associated viewer application (e.g., ADOBE® READER®, ADOBE® ACROBAT®, MICROSOFT® WORD®, etc.) contacts the rights management server and presents the rights management server with the user's credentials and with metadata associated with the protected document. The rights management server verifies the user's credentials and, if the verification is successful, determines the rights management policy that governs the protected document. The rights management server then determines whether the user has access to the protected document at this time. If the user has access to the protected document, the rights management server sends decryption information and policy information to the viewer application. The viewer application decrypts the file's data and presents the data to the user according to the protections specified by the policy. For instance, if the policy specifies that printing is not allowed, the viewer application may disable the "Print" menu item.

In the above scenario, the viewer application is configured such that it can be trusted to enforce permissions and restrictions specified by the policy. This can be achieved through standard authentication mechanisms, such as challenge and response decryption/encryption queries. In some existing systems, only a trusted viewer application can obtain from the rights management server the decryption information associated with the protected document, such that only that viewer application can decrypt the protected document. Once the protected document is decrypted, the viewer application proceeds to control all access to the information in that protected document.

The situation becomes more complex with collaborative applications, such as, e.g., ADOBE® ACROBAT® Connect Pro. A collaborative application may manage a session that includes not only multiple end users, but also multiple data sources, e.g., various files opened by different viewer applications. Examples of a viewer application include various web browsers, as well as document viewing applications such as ADOBE® READER®, ADOBE® ACROBAT®, MICROSOFT® WORD®, etc. The rights that are enforced by collaborative applications are typically related to rights granted to collaborative session participants with respect to a collaborative session. For instance, some users may be granted the right to present content (and may be referred as presenter participants), some users may be granted the right to participate in a chat session initiated within the collaborative session, while others may be permitted to only watch a presentation and not even view the chat messages being exchanged by other participants. In other words, the rights and restrictions that can be enforced by some collaborative applications are not based on the content being shared and therefore are not associated with any DRM policies that may govern the shared content. Some existing client applications that enforce DRM policies may be configured to suppress sharing of a protected file via a collaborative application.

In one example embodiment, a method and a system are provided to permit enforcement of DRM policies with respect to a protected piece of content in the context of a collaborative session. A collaborative session may be among a plurality of participants, where each participant accesses the session via a collaborative viewer application (or simply a collaborative viewer) accessible from the participants' respective client computer systems. The exchange of data between the participants of the collaborative session may be effectuated via a server side application that may be termed a collaboration host. For example, when a DRM-protected electronic document is opened on a desktop that is being shared among several participants of a collaborative session, a collaboration host may first obtain the DRM policy that governs the electronic document and only then distribute the electronic document to participants' computer systems together with a filter that includes information indicative of the associated policy. The DRM policy may be obtained, e.g., from a rights management server configured to store DRM policies.

At a computer system associated with a participant of a collaborative session, a collaborative viewer may be configured to detect that the received shared content includes protected content, and then determine the rights of the participant based on the information included in the filter. The collaborative viewer may then display the DRM-protected electronic document in accordance with the participant's rights with respect to the document. Some examples of a collaborative viewer displaying protected content in accordance with the access rights of a participant are discussed further below, with reference to FIGS. 5-7.

In one embodiment, collaborative applications may be configured to be trusted by one or more rights management servers to apply the rights and protections granted by rights policies associated various files (or any compilation of data) being presented to various users. One example approach to configure a collaborative application (a collaboration host in particular) such that it can enforce rights management policies with respect to protected content is to provide a mechanism where the collaboration host first determines a view of the shared content that should be presented to each of the participants of a collaborative session based on any applicable rights management policies, and then delivers to each participant the view in accordance with their respective permissions. This technique may be appropriate for collaborative sessions with a limited number of participants and a limited amount of data being shared. Another approach includes leveraging the fact that collaborative applications viewing the shared session (collaborative viewers) are themselves trusted to enforce permissions specified by respective governing policies, thus reducing the burden on the collaboration host. As mentioned above, a collaboration host, in one example embodiment, may be configured to detect protected content included with the content designated as shared content, determine the associated policy, and then specify to the collaborative viewers which portions of the shared content are controlled by what policies. The applications receiving the shared data (e.g., collaborative viewers) may be required to be successfully authenticated by a rights management server prior to being permitted to participate in a collaborative session. In a simple case, where one document is being shared among many users, each collaborative viewer may limit what their user can do to/with the entire shared session based on the document's policy and their user's role in that policy. In a more complicated case, multiple documents may be shared among the participants of a collaborative session. In this scenario, a collaborative viewer of a participant may either fully enable or protect the corresponding portion of the display screen, window, or pod, etc, based on the associated policy as applied to the participant. A collaborative viewer may also be configured to implement protection mechanisms, such as, e.g., overlay a watermark onto a displayed document, prevent printing, prevent copying of data, etc.

As described above, when a collaborative viewer receives shared data to be distributed to participants of a collaborative session, the collaborative viewer may access the filter provided with the shared data, access the policy associated with protected content, and determine permissions of the user of the collaborative viewer with respect to the protected content. For example, the user of the collaborative viewer may have an "Administrator" role, and the policy indicated in the filter may specify that users assigned an "Administrator" role are permitted to view, edit, manipulate, copy, and print the protected shared content. The collaborative viewer may then render the protected shared content to the "Administrator" user without restricting the user from performing any of the above-mentioned operations. Example method and system to enforce digital rights in a collaborative environment may be described with reference to a network environment illustrated in FIG. 1.

FIG. 1 shows an example network environment 100, within which a system for managing digital rights in a collaborative environment may be implemented. The network environment 100 may include one or more client systems, such as a client system 110 and a client system 120, and a server system 140. The client systems 110, 120, and the server system 140 may be in communication with each other via a network 130. The communications network 130 may be a public network (e.g., the Internet, a wireless network, a public switched telephone network (PSTN), etc.) or a private network (e.g., LAN, WAN, Intranet, etc.).

As shown in FIG. 1, the clients 110 and 120 have respective collaborative viewers 112 and 122. The server system 140 includes a collaboration host 142. A collaborative session may be initiated by a user from one of the collaborative viewers 112 and 122. After a collaborative session is initiated, a participant may designate an electronic document (or the entire desktop) as shared content that is to be distributed to all participants of the collaborative session. The shared content is first received by the collaboration host 142 and then distributed to the participants of the collaborative sessions (e.g., to users of the collaborative viewers 112 and 122). In one example embodiment, the collaboration host 142 may be configured to manage collaborative sessions and process any protected content that is being shared in a manner that permits application of associated rights management policy. The collaboration host 142 may be in communication with a rights management server 150. The rights management server 150 may store rights management policies 152 associated with protected content (e.g., associated with protected electronic documents). It will be noted, that the collaboration host 142 and the rights management server 150 may reside at the same server system or at distinct server systems. An example collaboration host may be discussed with reference to FIG. 2.

Figure 2:
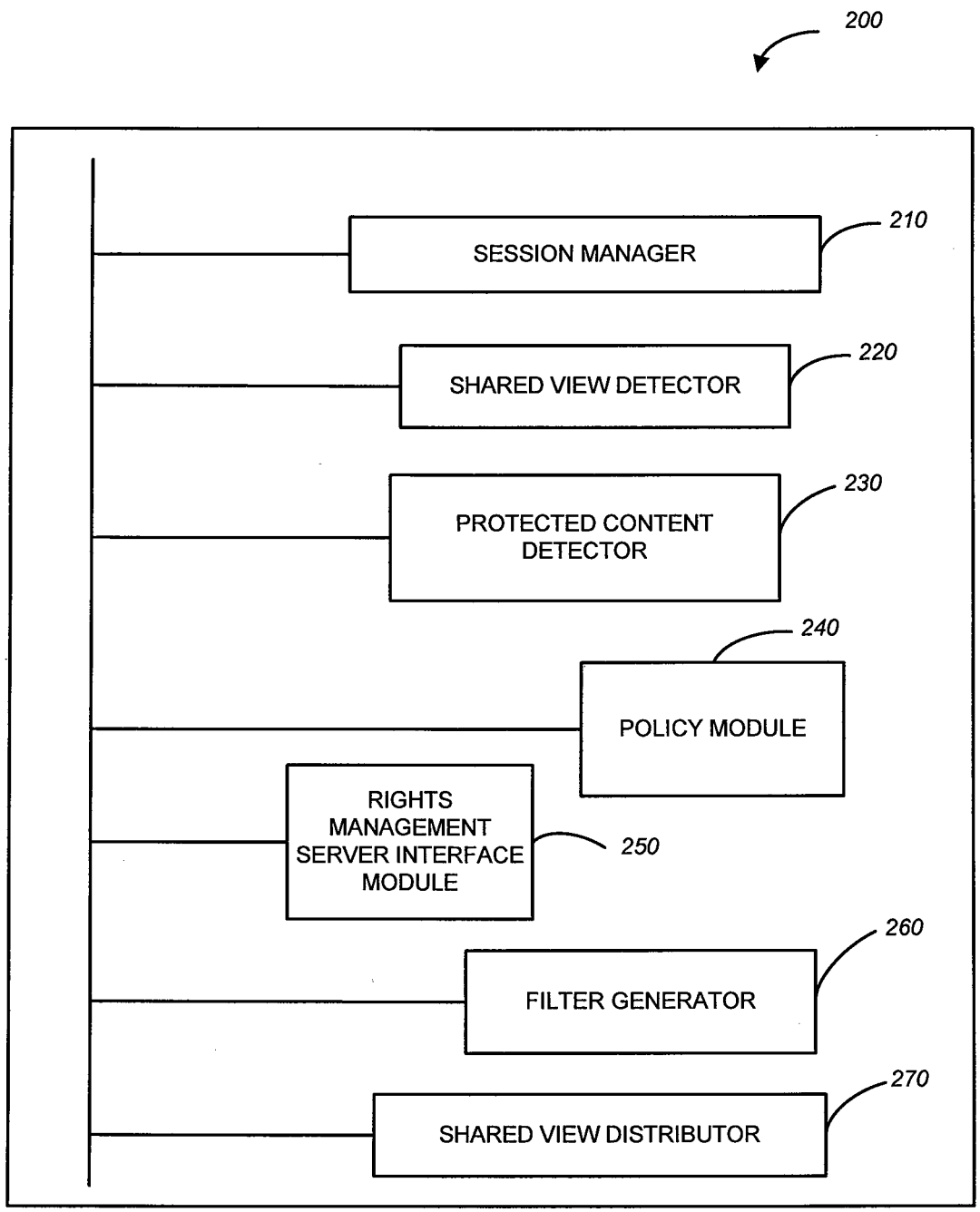
FIG. 2 is a block diagram illustrating a collaborative application with DRM capabilities, in accordance with an example embodiment.

FIG. 2 shows a block diagram illustrating a collaboration host system 200, according to one example embodiment. As shown in FIG. 2, the collaboration host system 200 includes a session manager 210, a shared view detector 220, a protected content detector 230, a policy module 240, a rights management server interface module 250, a filter generator 260, and a shared view distributor 270. The collaboration host system 200, in one example embodiment, corresponds to the collaboration host 142 of FIG. 1.

The session manager 210 may be configured to manage a collaborative session associated with a plurality of participants. The shared view detector may be configured to detect a request to distribute shared content to participants of the collaborative session, e.g., a request to distribute the desktop of the client system 110 of FIG. 1 to the collaborative viewer 122 running on the client system 120 of FIG. 1. The protected content detector 230 may be configured to determine that the shared content includes protected content (e.g., a protected electronic document) and that the rights management server 150 of FIG. 1 needs to be accessed to obtain the rights management policy for the protected content. The policy module 240 may cooperate with the rights management server interface module 250 to obtain a rights management policy associated with the protected content. The filter generator 260 may be configured to generate a filter based on the obtained rights management policy. The shared view distributor 270 may be configured to distribute the shared content to participants of the collaborative session together with the filter. As mentioned above, distributing the shared content together with information indicative of the rights management policies that govern protected portions of the shared content may permit the collaborative viewers participating in the session to enforce the rights management policies on a per-document basis. Various operations performed by the collaboration host system 200, according to an example embodiment, may be discussed with reference to FIG. 3.

Figure 3:
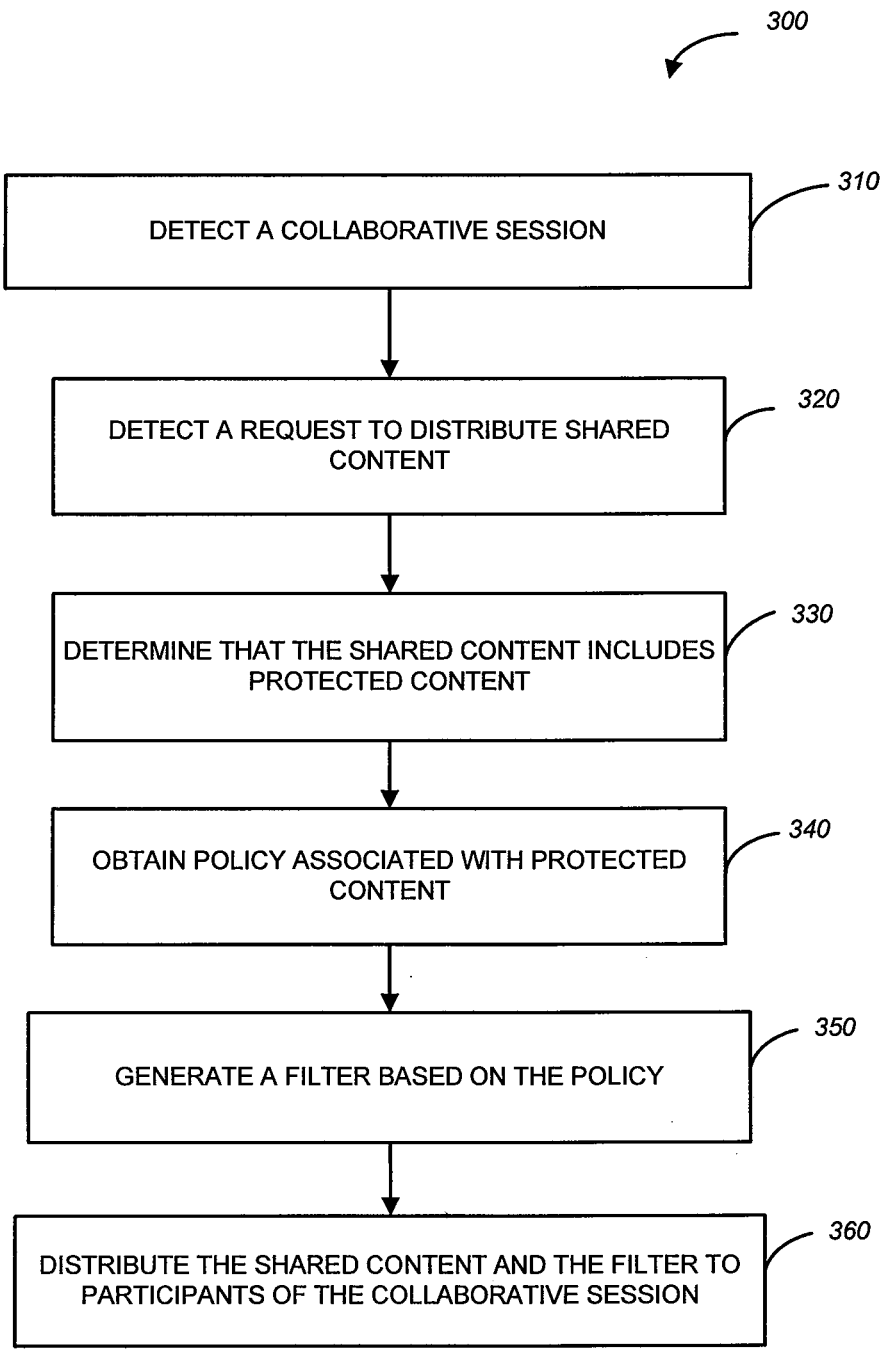
FIG. 3 is a flow chart illustrating a method for processing protected shared content at a collaboration host, in accordance with an example embodiment.

FIG. 3 is a flow chart illustrating a method 300 for processing protected shared content at a collaboration host, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. The processing logic, according to example embodiments, may reside in any of the modules shown in FIG. 2.

As shown in FIG. 3, the method 300 commences with operation 310, where the session manager 210 of FIG. 2 detects a collaborative session. As mentioned above, a collaborative session may permit several participants to share content, e.g., one or more electronic documents or an entire desktop of one of the participants. At operation 320, the shared view detector 220 of FIG. 1 detects a request to distribute shared content. Such request may be triggered, e.g., by a presenter participant opening an electronic document to be shared with other participants of the collaborative session. The shared content that is the subject of the request is then examined by the protected content detector to determine whether the shared content includes any protected content, e.g., an electronic document protected by a DRM policy (operation 330). At operation 340, the filter generator 260 may employ the rights management server interface module 250 to obtain the rights management policy that governs the protected content and generates a filter that contains information regarding the associated policy, at operation 350. The shared view distributor 270 distributes to the participants of the collaborative session not only the shared content, but also the generated filter, at operation 360.

As mentioned above, a collaborative view may be configured to recognize that the received shared content includes protected content and to perform operations in order to display the protected content in accordance to any rights granted to a user of the collaborative viewer with respect to the protected content. This approach may be described with reference to FIG. 4.

Figure 4:
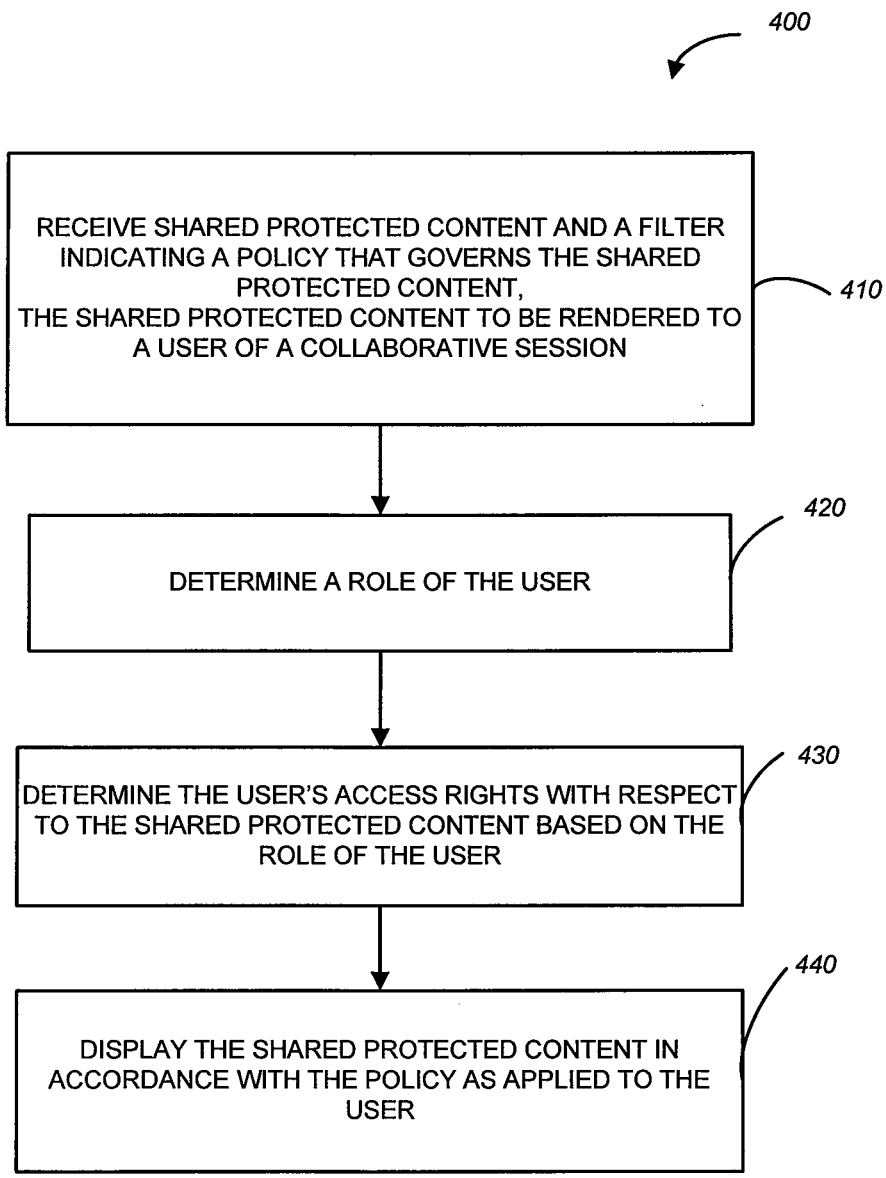
FIG. 4 is a flow chart illustrating a method for processing protected content received from a collaboration host, in accordance with an example embodiment.

FIG. 4 is a flow chart illustrating a method 400 for processing protected content received from a collaboration host, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. The processing logic, according to example embodiments, may reside in any of the modules shown in FIG. 2.

As shown in FIG. 4, the method 400 commences with operation 410, where a collaborative viewer receives shared content and the associated filter. At operation 420, the viewer application determined the role of a user that is logged-in as a collaborative session participant via the collaborative viewer. Based on the determined role, the viewer application determines the user's access rights with respect to the shared contents, at operation 430. At operation 440, the collaborative viewer displays the shared content in accordance with the determined access rights of the user. Example views illustrating different views of protected content presented by a collaborative viewer to users having different roles and different access rights, in accordance with an example embodiment, may be described with reference to FIGS. 5-7.

Figure 5:
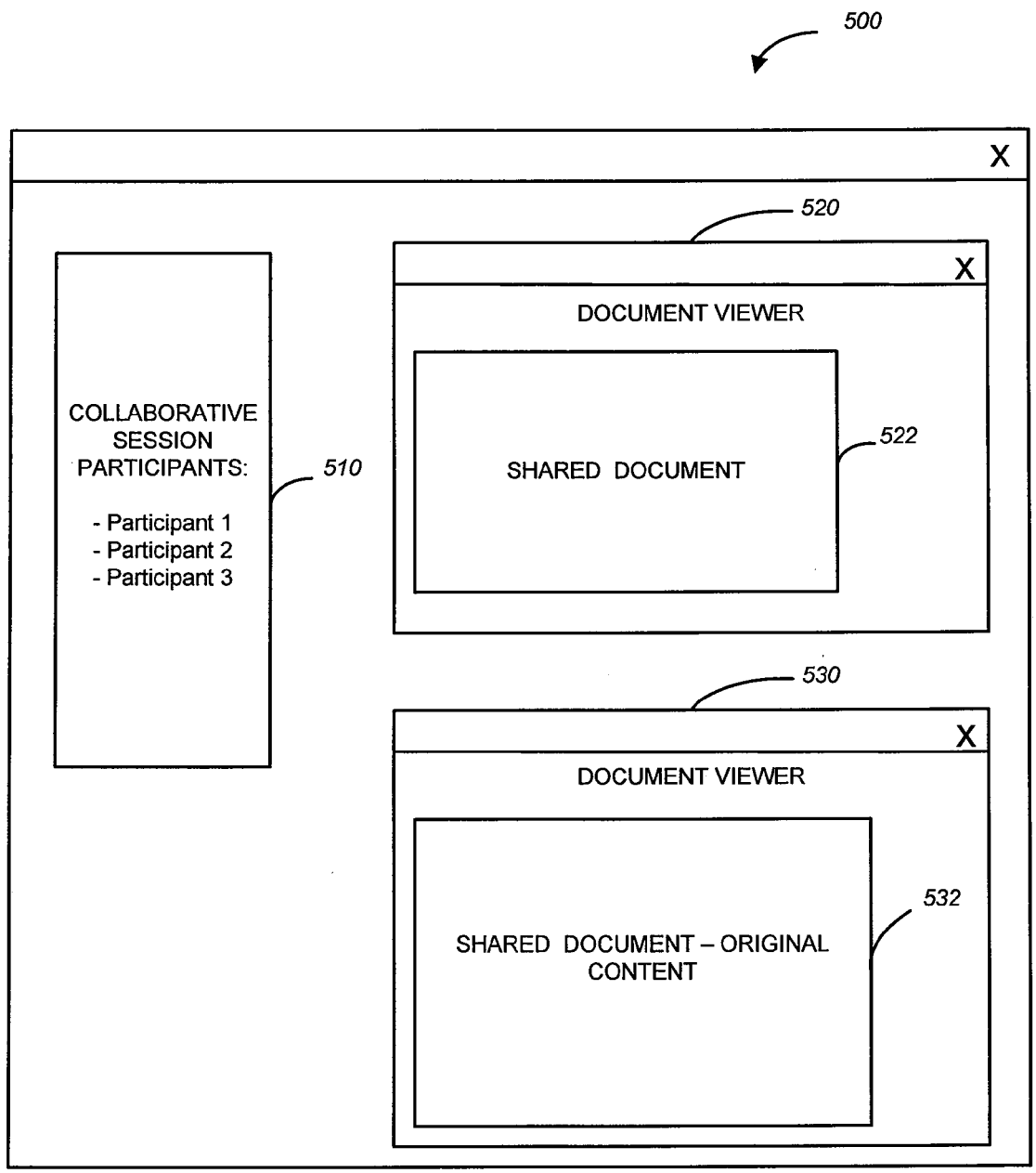
FIG. 5-FIG. 7 are a diagrammatic representations of different views of protected content presented by a collaborative viewer to users having different roles and different access rights, in accordance with an example embodiment.

FIG. 5 is a diagrammatic representation of a view 500 representing an example collaborative session, in accordance with an example embodiment, as seen by the presenter participant. As shown in FIG. 5, the represented collaborative session includes three participants listed in an area 510. There are two viewer applications opened—a document viewer 520 and a document viewer 530. Each of the document viewers 520 and 530 include respective document viewing areas 522 and 532. The document viewing area 532 is shown to present the original version of a protected electronic document.

Figure 6:
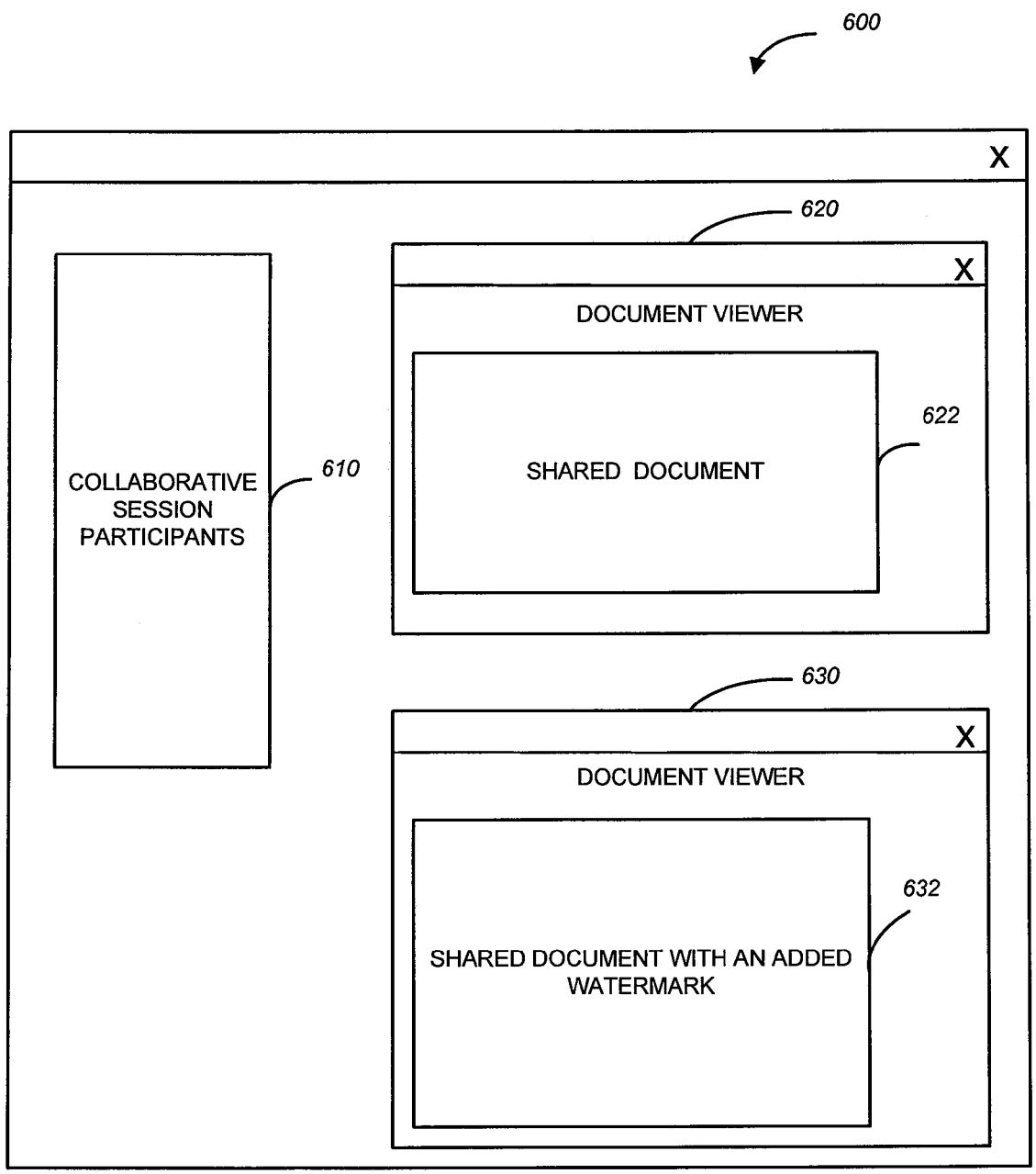

FIG. 6 is a diagrammatic representation of a view 600 representing an example collaborative session, in accordance with an example embodiment, as seen by a participant with an assigned "employee" role. The view 600 shown in FIG. 6 correspond to the view 500 of FIG. 5, as presented to a participant whose role warrants certain restrictions with respect to a document displayed in a viewing area 632 of a document viewer 630. A collaborative session includes three participants listed in an area 610. A viewing area 622 of a document viewer 620 is the same as in the view 500, which may indicate that an electronic document presented in a document viewing area 622 is not governed by a rights management policy. The viewing area 632 of the document viewer 630 shows the protected electronic document with an added watermark (e.g., specifying to the employee participant that the displayed content includes confidential information).

Figure 7:
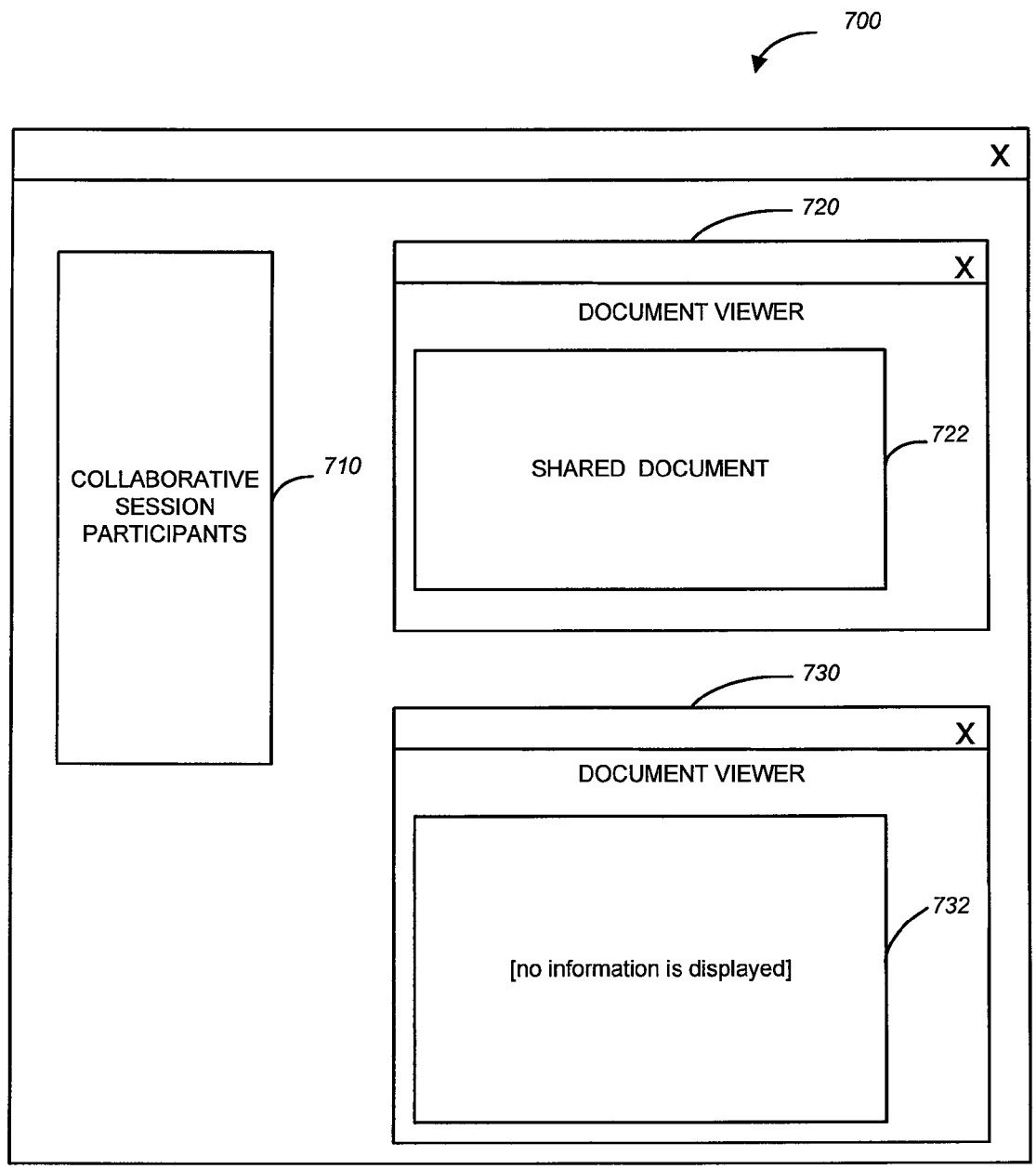

FIG. 7 is a diagrammatic representation of a view 700 representing an example collaborative session, in accordance with an example embodiment, as seen by a participant with an assigned "non-employee" role. The view 700 shown in FIG. 7 correspond to the view 500 of FIG. 5, as presented to a non-employee participant. A collaborative session still includes three participants listed in an area 710. A viewing area 722 of a document viewer 720 is the same as in the view 500. A viewing area 732 of the document viewer 730 is blank, because non-employees do not have access to the protected document, according to the associated rights management policy.

Figure 8:
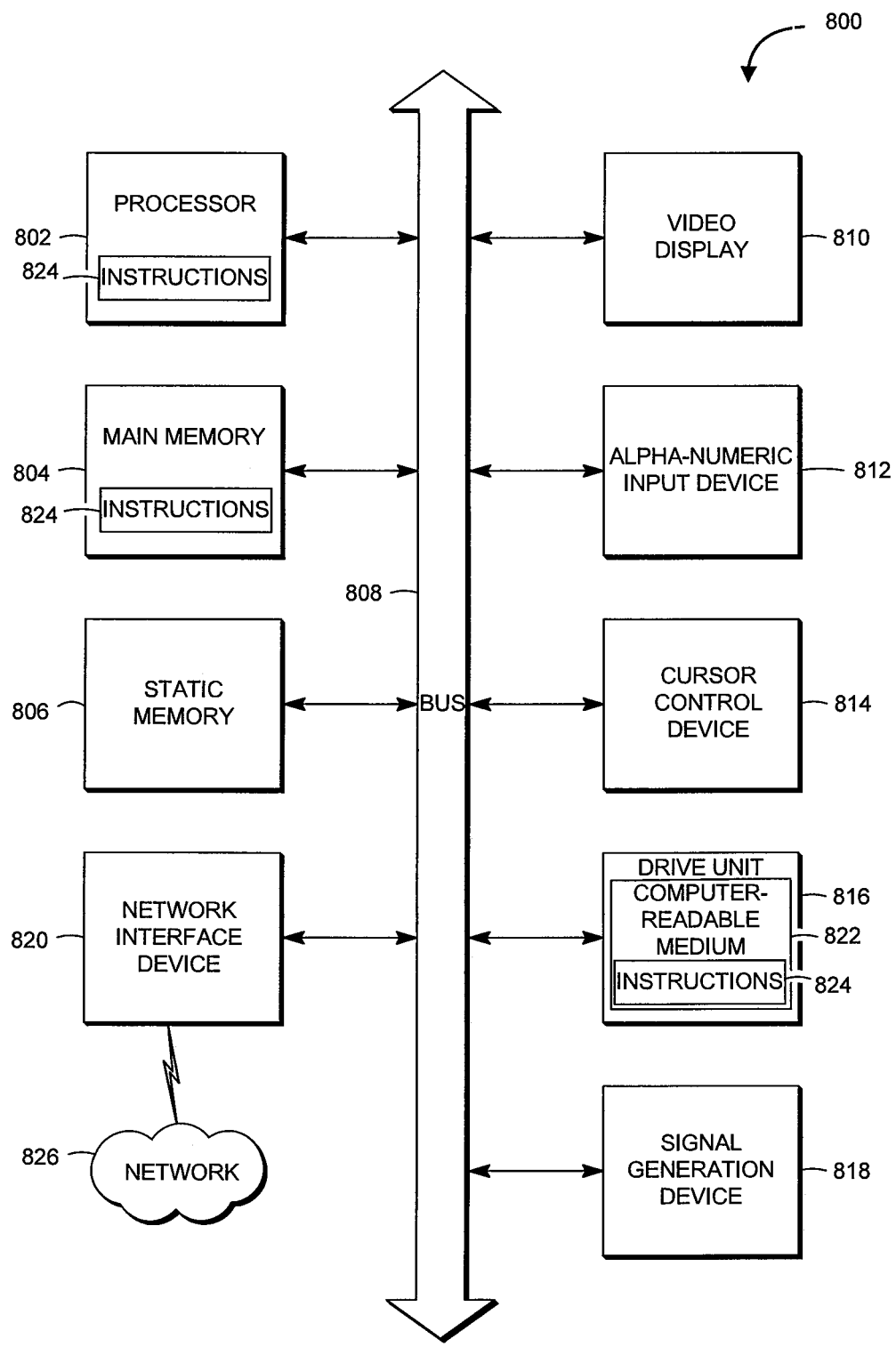
FIG. 8 is a diagrammatic representation of a machine in the example form of a computer system within which a set of instructions, for causing the machine to perform any one or more of the methodologies discussed herein, may be executed.

FIG. 8 is a diagrammatic representation of a machine in the example electronic form of a computer system 800 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

The disk drive unit 816 includes a computer-readable (or machine-readable) medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820 utilizing any one of a number of well-known transfer protocols (e.g., Hyper Text Transfer Protocol (HTTP)).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

Thus, method and system to enforce digital rights in a collaborative environment have been described. The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system comprising:
a memory;
at least one processor coupled to the memory;
a session manager to manage a collaborative session between a plurality of participants;
a shared view detector to detect a request to distribute shared content to the plurality of participants of the collaborative session;
a policy module to access a rights management policy associated with at least a protected portion of the shared content;
a filter generator to generate, using the at least one processor, a filter based on the rights management policy, the filter applying only to that portion of the shared content being controlled by the rights management policy, the filter including an indication to suppress functional control of a computer program having an associated collaborative viewer; and
a shared view distributor to distribute the shared content to the plurality of participants of the collaborative session together with the filter.

2. The system of claim 1, including a content detector to detect protected content included in the shared content.

3. The system of claim 2, the rights management policy is to designate access rights of one or more users based on respective roles assigned to the one or more users.

4. The system of claim 1, wherein the filter is to specify a first portion of the shared content as being controlled by the rights management policy.

5. The system of claim 1, wherein
the shared view distributor is to distribute the shared content and the filter to the collaborative viewer associated with the computer program.

6. The system of claim 1, wherein the functional control associated with the operating system is a print screen functional control.

7. The system of claim 1, wherein the shared content includes a protected electronic document.

8. A method comprising:
detecting a collaborative session;
detecting a request to distribute shared content to participants of the collaborative session;
accessing a rights management policy associated with at least a protected portion of the shared content;
generating, using at least one processor, a filter based on the rights management policy, the filter including an indication to suppress functional control of a computer program having an associated collaborative viewer; and
distributing, from a host computer system, the shared content to the participants of the collaborative session together with the filter.

9. The method of claim 8, wherein the shared content includes an electronic document protected by the rights management policy.

10. The method of claim 9, wherein the rights management policy includes access rights to the electronic document of one or more users associated with a role with respect to a collaborative viewer application.

11. The method of claim 10, wherein the access rights designate read-only access to the electronic document.

12. The method of claim 10, wherein the access rights designate no access to the electronic document.

13. The method of claim 8, comprising:
receiving, at a collaborative viewer hosted by a client system, the shared content and the filter;
determining a user of the collaborative viewer;

determining access rights of the user with respect to the shared content, based on the filter; and displaying a display area associate with the shared content based on the determined access rights of the user.

14. The method of claim 8, wherein the shared content includes a protected electronic document in a portable document format (PDF).

15. The method of claim 8, wherein the shared content comprises a first electronic document associated with a first viewing application and a second electronic document associated with a second viewing application.

16. The method of claim 8, wherein the obtaining of the rights management policy comprises communicating with a rights management server.

17. The method of claim 8, comprising:
receiving, from the host computer system via a network, at a collaborative viewer, the shared content and the filter;
examining, at a collaborative viewer, the rights management policy with respect to a current user of the collaborative viewer; and
displaying data associated with the protected portion of the shared content based on the rights management policy.

18. The method of claim 17, wherein the displaying of data associated with the protected portion of the shared content comprises displaying a redacted version of the protected portion of the shared content.

19. A machine-readable non-transitory storage medium may be provided having instruction data to cause a machine to:
detect a collaborative session;
detect a request to distribute shared content to participants of the collaborative session;
obtain rights management policy associated with at least a protected portion of the shared content;
generate a filter based on the obtained rights management policy, the filter applying only to that portion of the shared content being controlled by the rights management policy, the filter including an indication to suppress functional control of a computer program having an associated collaborative viewer; and
distribute the shared content to the participants of the collaborative session together with the filter.

* * * * *